United States Patent
Mukai

(10) Patent No.: US 10,014,753 B2
(45) Date of Patent: Jul. 3, 2018

(54) MAGNETIC SENSOR HAVING POSITION-ADJUSTABLE DETECTION PORTION AND MOTOR HAVING THE SAME

(71) Applicant: FANUC CORPORATION, Minamitsuru-gun, Yamanashi (JP)

(72) Inventor: Yasuhito Mukai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 160 days.

(21) Appl. No.: 15/200,115

(22) Filed: Jul. 1, 2016

(65) Prior Publication Data
US 2017/0018999 A1   Jan. 19, 2017

(30) Foreign Application Priority Data
Jul. 17, 2015   (JP) .................. 2015-143151

(51) Int. Cl.
*H02K 7/116* (2006.01)
*H02K 11/215* (2016.01)
*G01D 11/24* (2006.01)
*G01D 5/14* (2006.01)

(52) U.S. Cl.
CPC ......... *H02K 11/215* (2016.01); *G01D 11/245* (2013.01); *G01D 5/145* (2013.01)

(58) Field of Classification Search
CPC ...... H02K 11/215; H02K 7/116; G01D 5/145; G01D 11/245
See application file for complete search history.

(56) References Cited

U.S. PATENT DOCUMENTS

| 4,818,907 A * | 4/1989 | Shirotori ............ G11B 19/2009 310/67 R |
| 4,952,830 A * | 8/1990 | Shirakawa ............ H02K 29/08 310/68 B |
| 7,291,949 B2 * | 11/2007 | Liu .......................... H02K 5/22 310/67 R |
| 2009/0161264 A1 | 6/2009 | Meyersweissflog |
| 2013/0033259 A1 * | 2/2013 | Hara ..................... G01R 33/072 324/207.24 |

FOREIGN PATENT DOCUMENTS

| JP | S62-180215 A | 8/1987 |
| JP | S63008617 U | 1/1988 |
| JP | 2007127530 A | 5/2007 |

* cited by examiner

*Primary Examiner* — Dang Le
(74) *Attorney, Agent, or Firm* — RatnerPrestia

(57) ABSTRACT

A detection portion on a sensor holder attached to a sensor mounting base is arranged to be opposed to an outer periphery of a sensor gear at a predetermined distance. The sensor holder has a holder body which holds the detection portion and a portion to be fastened which is fastened to the sensor mounting base by screws. The portion to be fastened is provided integrally with one side of the holder body that is located to face opposite the sensor gear. At least the portion to be fastened of the sensor holder is made of a material having an elastic modulus lower than the materials of the sensor mounting base and the screws.

5 Claims, 8 Drawing Sheets

MAGNETIC SENSOR HAVING POSITION-ADJUSTABLE DETECTION PORTION AND MOTOR HAVING THE SAME

BACKGROUND OF THE INVENTION

1. Field of the Invention

The present invention relates to a magnetic sensor for detecting a rotational speed or rotational angle of a motor and a motor having the magnetic sensor.

2. Description of the Related Art

Some of motors used in a machine tool or an industrial robot, etc., have a magnetic sensor incorporated therein to detect a rotational speed or a rotational angle thereof.

FIG. 8A is a perspective view showing the structure of a conventional magnetic sensor incorporated in a motor, and FIG. 8B is a view of the magnetic sensor as viewed from the direction indicated by the arrow A in FIG. 8A.

The conventional magnetic sensor 100 shown in FIG. 8A is composed of a sensor gear 102 attached to a rotor 101 of the motor, a detection portion 103 which detects signals indicating the presence or absence of a plurality of teeth 102 which are formed in series at predetermined distances on the outer periphery of the sensor gear 102, a sensor holder 104 which holds the detection portion 103, a sensor mounting base 105 to which the sensor holder 104 is attached, and mounting screws 106 by which the sensor holder 104 is attached to the sensor mounting base 105. In particular, as can be seen in FIG. 8B, when the sensor holder 104 is attached to the sensor mounting base 105, the detection portion 103 on the sensor holder 104 is opposed to the outer periphery of the sensor gear 102.

The detection portion 103 is provided with a Hall element 103a whose output voltage varies depending on a change in the magnetic field. The sensor gear 102 is made of a magnetic material, and accordingly, the magnetic field changes with respect to the Hall element 103a in accordance with the absence or presence of the teeth 102a of the sensor gear 102 opposed to the Hall element 103a. Therefore, when one of the plurality of teeth 102a of the sensor gear 102 is opposed to the Hall element 103a of the detection portion 103, the Hall element 103a of the detection portion 103 outputs a signal representing the presence of the tooth 102a, that is, a detection signal. Furthermore, the plurality of teeth 102a of the sensor gear 102 move across the front of the detection portion 103 during the rotation of the sensor gear 102 together with the rotation of the rotor 101, and therefore, the detection signals are periodically issued from the detection portion 103. Thus, the conventional magnetic sensor 100 detects the rotational speed of the rotor 101 based on the frequency of the detection signals of the teeth 102a.

The detection signals outputted by the detection portion 103 become more intense as a distance between the sensor gear 102 and the detection portion 103 decreases, and conversely, the detection signals become less intense as the distance increases. Therefore, the distance between the sensor gear 102 and the detection portion 103 must be finely adjusted so that the detection portion 103 can judge the presence or absence of the teeth 102a of the sensor gear 102.

When the distance between the sensor gear 102 and the detection portion 103 is adjusted as mentioned above, conventionally, a skilled operator provisionally attaches the sensor holder 104 to the sensor mounting base 105 by screws, and thereafter, makes a fine adjustment of the distance by pushing or striking the detection portion 103. Furthermore, as a skilled operator makes an adjustment while viewing the waveform of the detection signals issued from the detection portion 103, it is necessary to continuously rotate the sensor gear 102 during the adjustment of the distance.

It is difficult to estimate the displacement of the detection portion 103 in the adjustment of the distance by pushing or striking the detection portion 103. Consequently, it takes a long time not only for an unskilled operator but also a skilled operator to make a distance adjustment. Moreover, even a skilled operator may bring the detection portion 103 into contact with the sensor gear 102 which is rotating, thus resulting in a breakage of the sensor gear 102 or the detection portion 103.

To prevent the detection portion 103 from being broken during the distance adjustment as mentioned above, Japanese Patent Application Laid-open No. 62-180215 has proposed a solution thereto. Namely, Japanese Patent Application Laid-open No. 62-180215 discloses a method for adjusting the distance between an object to be detected and a magnetic drum wherein an object base and an encoder base engage with each other through a distance adjustment screw which extends in the direction in which the object to be detected and the magnetic drum are spaced from one another, so that the distance between the object and the magnetic drum can be adjusted by moving the object base by the adjustment of the fastening degree of the distance adjustment screw.

However, in the adjustment method disclosed in Japanese Patent Application Laid-open No. 62-180215, the shaft for tilting the object to be detected is adjusted by an angle adjustment screw as well. After the completion of the adjustment of the distance between the object to be detected and the magnetic drum and the shaft for tilting the object to be detected, the distance adjustment screw and the angle adjustment screw are secured by an adhesive. Therefore, it is necessary not only to adjust the distance between the object to be detected and the magnetic drum and the shaft for tilting the object to be detected by the respective screws but also to use an adhesive. As a result, the distance adjustment may require a long time to complete.

SUMMARY OF THE INVENTION

The present invention provides a magnetic sensor in which the distance between the sensor gear and the detection portion can be adjusted within a short period of time and a motor having the same.

According to a first aspect of the present invention, there is provided a magnetic sensor comprising a sensor gear attached to a rotor of a motor, a detection portion which outputs a signal representative of the presence or absence of a plurality of teeth provided on an outer periphery of the sensor gear at predetermined intervals, a sensor holder which holds the detection portion, a sensor mounting base to which the sensor holder is attached, and a screw by which the sensor holder is attached to the sensor mounting base, wherein the detection portion on the sensor holder attached to the sensor mounting base is arranged to be opposed to the outer periphery of the sensor gear at a predetermined distance, the sensor holder has a holder body which holds the detection portion and a portion to be fastened which is fastened to the sensor mounting base by the screw, the portion to be fastened is provided integrally with one side of the holder body that is located to face opposite the sensor gear, and at least the portion to be fastened of the sensor holder is made of a material having an elastic modulus lower than the materials of the sensor mounting base and the screw.

According to a second aspect of the present invention, in the magnetic sensor according to the aforementioned first aspect, the portion to be fastened comprises a flat plate.

According to a third aspect of the present invention, in the magnetic sensor according to the first aspect, a surface of the portion to be fastened with which a head of the screw is in contact is defined by a tapered surface, and the tapered surface extends so that the thickness of the portion to be fastened decreases as the distance of the portion to be fastened from the one side of the holder body increases.

According to a fourth aspect of the present invention, in the magnetic sensor according to any one of the first to third aspects, the two screws are arranged in the portion to be fastened so that the detection portion is placed in a position corresponding to a median point of the two screws.

According to a fifth aspect of the present invention, there is provided a motor comprising a magnetic sensor according to any one of the first to fourth aspects.

The aforementioned object, features and merits and other objects, features and merits of the present invention will become more apparent from the description of the representative embodiments of the present invention illustrated in the accompanying drawings.

DETAILED DESCRIPTION

Figure 1:
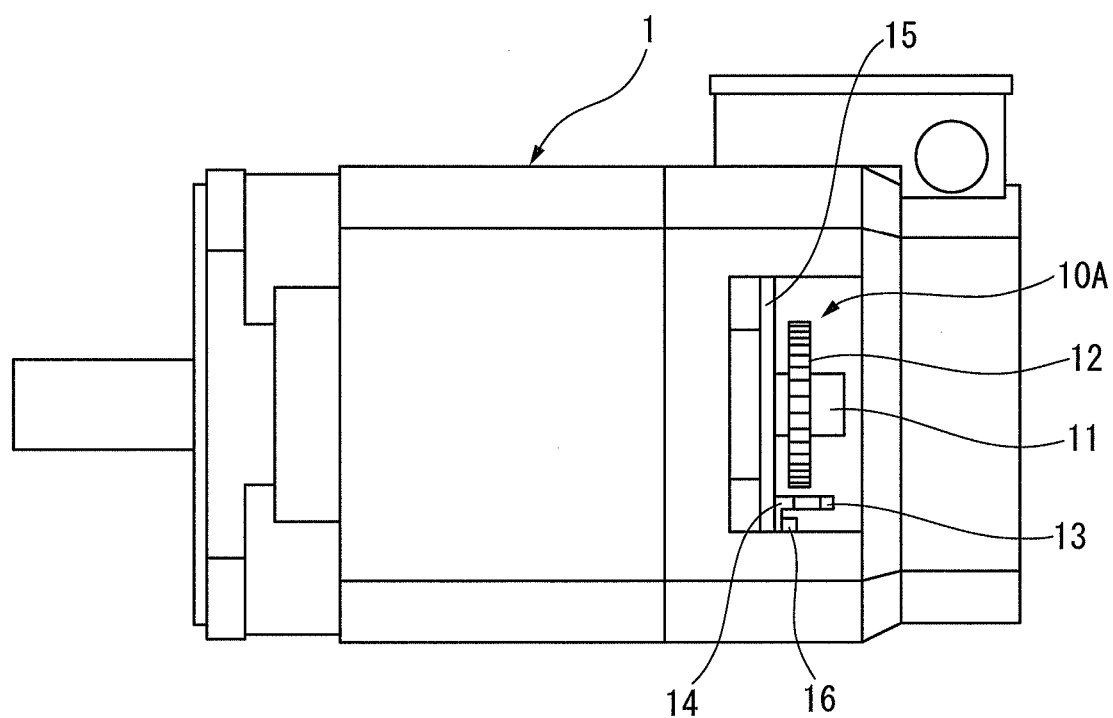
FIG. 1 is a view illustrating a motor having a magnetic sensor incorporated therein according to a first embodiment of the present invention.

The embodiments of the invention will be discussed below with reference to the accompanying drawings. In the drawings, the same or corresponding components are assigned the same reference numerals. It should be appreciated that the components assigned the same reference numerals in different drawings are those having the same function. For the sake of clarity, the scale of the drawings has been appropriately changed.

First Embodiment

FIG. 1 shows a motor having a magnetic sensor incorporated therein according to the first embodiment.

Figure 2:
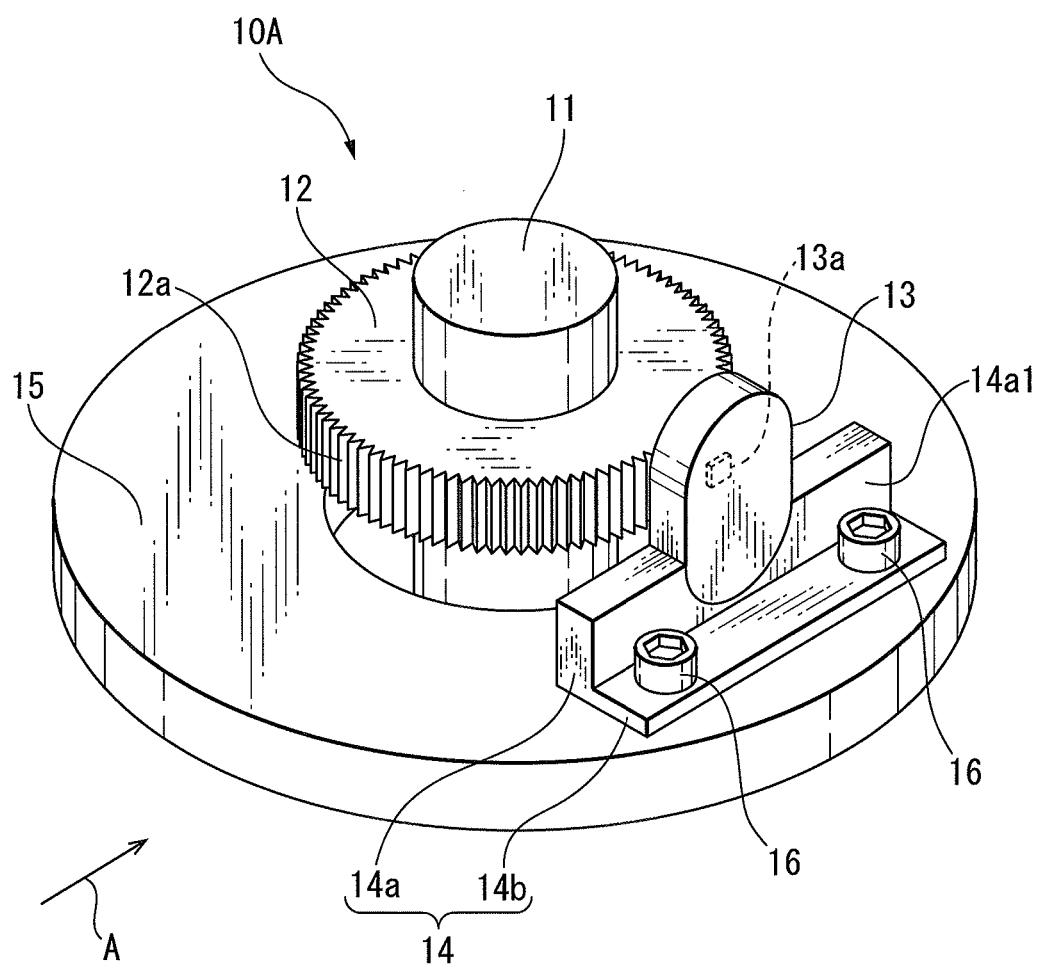
FIG. 2 is a perspective view of the magnetic sensor of the motor shown in FIG. 1.

FIG. 2 is a perspective view of the magnetic sensor of the motor shown in FIG. 1

As can be seen in FIGS. 1 and 2, the magnetic sensor 10A of the first embodiment comprises a sensor gear 12 attached to a rotor 11 of a motor 1, e.g., a servo motor, a detection portion 13 which detects signals indicating the presence or absence of a plurality of teeth 12a successively formed on the outer periphery of the sensor gear 12 at predetermined distances, a sensor holder 14 which holds the detection portion 13, a sensor mounting base 15 to which the sensor holder 14 is attached, and screws 16 by which the sensor holder 14 is attached to the sensor mounting base 15. In particular, as can be seen in FIG. 2, when the sensor holder 14 is attached to the sensor mounting base 15, the detection portion 13 on the sensor holder 14 is opposed to the outer periphery of the sensor gear 12 on which the teeth 12a are provided.

The detection portion 13 is provided with a Hall element 13a whose output voltage varies depending on a change in the magnetic field. The sensor gear 12 is made of a magnetic material, and accordingly, the magnetic field changes with respect to the Hall element 13a in accordance with the absence or presence of the teeth 12a of the sensor gear 12 opposed to the Hall element 13a. Therefore, when one of the plurality of teeth 12a of the sensor gear 12 is opposed to the Hall element 13a of the detection portion 13, the Hall element 13a of the detection portion 13 outputs a pulse signal representing the presence of the tooth 12a, that is, a detection signal. Furthermore, the plurality of teeth 12a of the sensor gear 12 move across the front of the detection portion 13 during the rotation of the sensor gear 12, and therefore, the detection signals are periodically issued from the detection portion 13. Thus, the magnetic sensor 10A detects the rotational speed of the rotor 11 based on the frequency of the detection signals from the detection portion 13. Namely, the magnetic sensor 10A is used as a rotary encoder. Note that, a magneto resistive effect element may be used in place of the Hall element 13a.

Figure 8A:
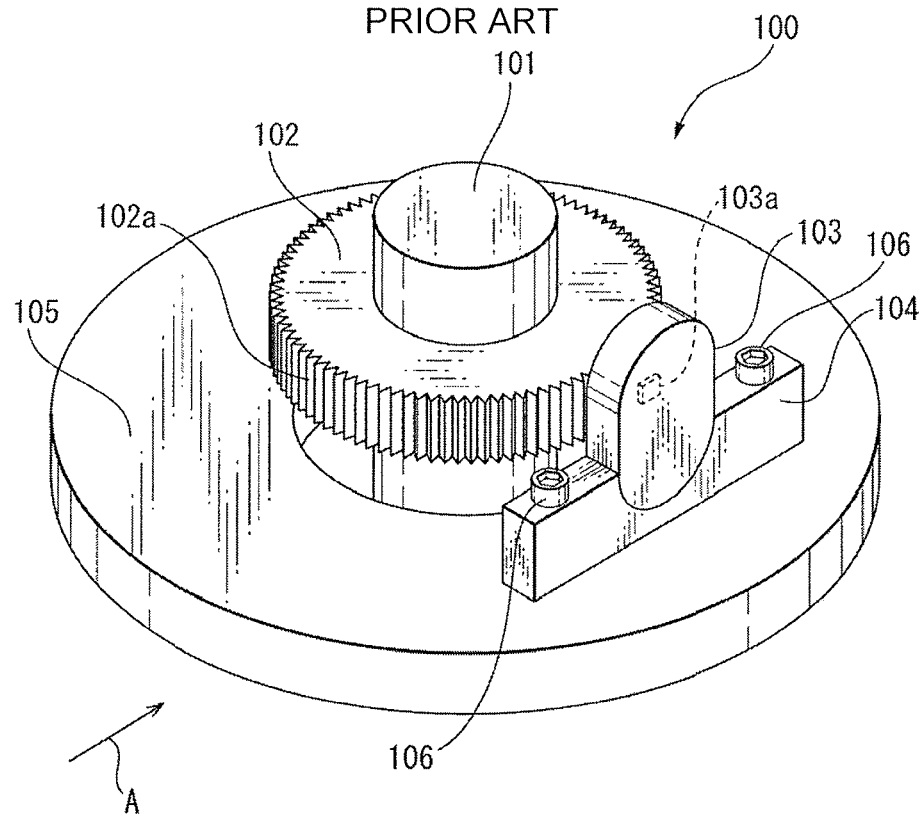
FIG. 8A is a perspective view of a conventional magnetic sensor incorporated in a motor.
Figure 8B:
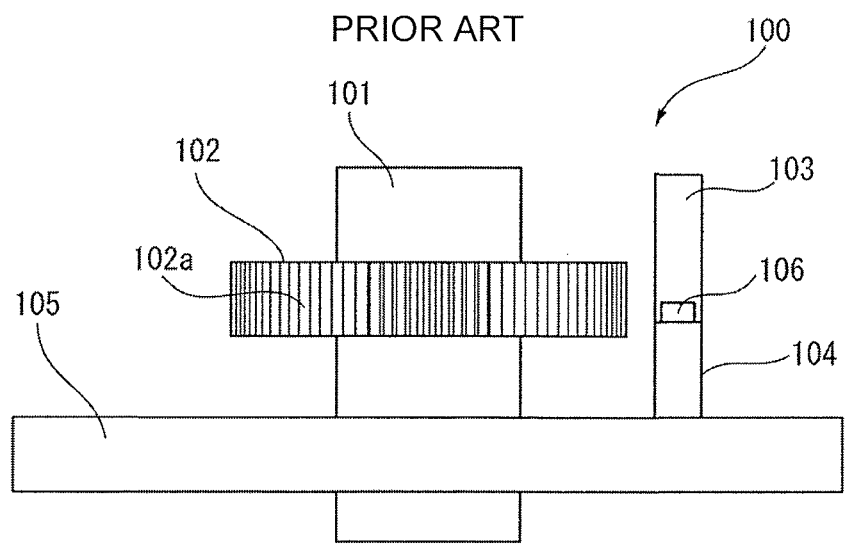
FIG. 8B is a view of the magnetic sensor as viewed in the direction indicated by the arrow A in FIG. 8A.

Compared with the conventional magnetic sensor 100 shown in FIG. 8A, the magnetic sensor 10A according to the first embodiment is different therefrom in the shape of the sensor holder 14. Namely, the sensor holder 14 is composed of a holder body 14a which holds the detection portion 13, and a portion to be fastened 14b which is fastened to the sensor mounting base 15 by screws 16. The portion to be fastened 14b is formed integrally with the side 14a1 of the holder body 14a that is located opposite the sensor gear 12. More specifically, the holder body 14a has a rectangular parallelepiped shape and the portion to be fastened 14b is in the form of a flat plate thinner than the holder body 14a. The sensor holder consisting of the holder body 14a and the portion to be fastened 14b has an L-shaped cross section.

Note that, in this embodiment, a part of the detection portion 13 is accommodated in a recess formed in the holder body 14a and is firmly secured to the holder body 14a by an adhesive. However, in the present invention, the securing method of the detection portion 13 is not limited thereto. The shape of the holder body 14a is not limited to a rectangular parallelepiped shown in FIG. 2 and the holder body 14a can be of any shape as long as the detection portion 13 can be firmly held. The shape of the portion to be fastened 14b is not limited to the flat plate like shape shown in FIG. 2. In the embodiment shown in FIG. 2, the single portion to be fastened 14b which is fastened to the sensor mounting base 15 by two screws 16 is illustrated, but in the present invention, a plurality of portions to be fastened 14b, each of which is fastened by each screw 16 may be provided.

Moreover, in the present invention, the sensor holder 14 is made of a material having an elastic modulus lower than sensor mounting base 15 and the screws 16. For example, if the screws 16 are made of rolled steel for a general structure (SS400), and the sensor mounting base 15 is made of aluminum die-casting (ADC12), the sensor holder 14 may be made of a magnesium alloy or epoxy resin, etc. Alternatively, if the screws 16 are made of rolled steel for a general structure (SS400), and the sensor mounting base 15 is made of stainless steel (SUS), the sensor holder 14 may be made of an aluminum alloy.

Moreover, the holder body 14a and the portion to be fastened 14b of the sensor holder 14 may be made of the same material or different materials. If different materials are used, the portion to be fastened 14b must be made of a material having an elastic modulus lower than the sensor mounting base 15 and the screws 16, in the present invention.

According to the magnetic sensor 10A which is shaped and made of a material as discussed above, it is possible to finely adjust the distance between the sensor gear 12 and the detection portion 13 by controlling the fastening strength of the screws 16. The principle of such a fine adjustment of the distance according to the present invention will be specifically discussed below with reference to FIGS. 3A and 3B.

Figure 3A:
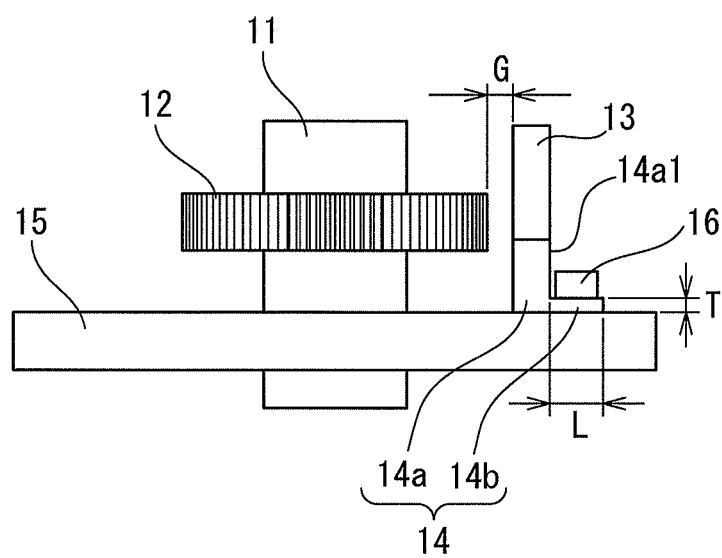
FIG. 3A is a view of the magnetic sensor as viewed in the direction indicated by the arrow A in FIG. 2.
Figure 3B:
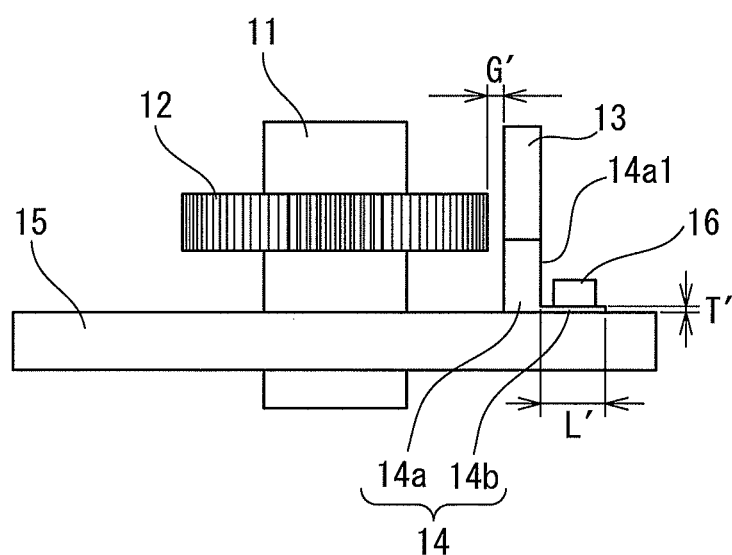
FIG. 3B is a view of a sensor holder shown in FIG. 3A, with the screw being further fastened.

FIG. 3A is a view of the magnetic sensor as viewed in the direction indicated by the arrow "A" in FIG. 2. In FIG. 3A, it is assumed that the thickness of the portion to be fastened 14b of the sensor holder 14 is T, the length of the portion to be fastened 14b from the one side 14a1 of the holder body 14a in the direction away from the holder body is L, and the distance between the sensor gear 12 and the detection portion 13 is G. FIG. 3B is a view of the sensor holder 14 corresponding to FIG. 3A, with the screws 16 being further fastened.

In the sensor holder 14 shown in FIG. 3A, when the screws 16 are fastened, the portion to be fastened 14b is pressed in the axial direction of the screws 16 by the heads of the screws 16 due to the axial thrust (fastening force) of the screws 16, so that an elastic deformation of the portion to be fastened 14b occurs. Namely, the thickness T of the portion to be fastened 14b is reduced to T' as shown in FIG. 3B. Furthermore, the length L of the portion to be fastened 14b is extended in the horizontal direction to L' as shown in FIG. 3B. As a result, the holder body 14a which holds the detection portion 13 is moved toward the sensor gear 12, so that the distance G between the sensor gear 12 and the detection portion 13 is reduced to G' as shown in FIG. 3B. This change in the distance G is achieved by the fact that at least the portion to be fastened 14b is made of a material having an elastic modulus lower than the materials of the sensor mounting base 15 and the screws 16. Namely, in the present invention, the distance G is adjusted due to the elastic displacement of the portion to be fastened 14b. Furthermore, as the elastic displacement is utilized in the present invention, the distance G can be finely adjusted.

Moreover, the sensor gear 12 is rotated during the adjustment of the distance G, so that a worker can adjust the distance while monitoring the waveform of the detection signals outputted from the detection portion 13. The worker can determine the most appropriate distance G for the detection portion 13 to judge the presence or absence of the teeth 12a of the sensor gear 12. Note that, if the distance G becomes too small, the screws 16 are loosened. Namely, when the screws 16 are loosened, the thickness T and the length L of the portion to be fastened 14b and the distance G are returned to those before the fastening of the screws due to the elastic restoring force of the portion to be fastened 14b.

When the portion to be fastened 14b is fastened to the sensor mounting base 15 by the two screws 16 as in this embodiment, the distance G can be adjusted by fastening the respective screws 16. As a matter of course, the number of the screws 16 is not limited to two, and it is sufficient that at least one screw 16 is provided as long as the sensor holder 14 can be secured thereby while adjusting the distance G as mentioned above.

When the two screws 16 are arranged so that the detection portion 13 is placed in a position corresponding to a median point of the two screws 16, as shown in FIG. 2, the angle of the detection portion 13 can be adjusted as well in addition to the distance G. The effect thereof will be discussed below with reference to FIG. 4.

Figure 4:
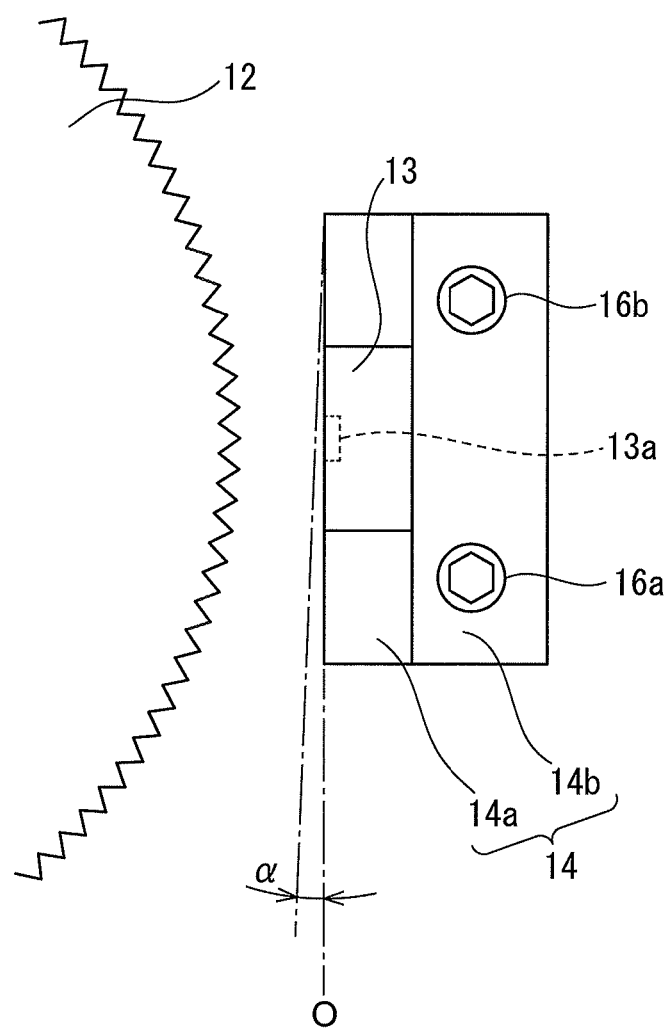
FIG. 4 is a schematic plan view of the detection portion shown in FIG. 2 and its surroundings to explain the angle adjustment of the detection portion.

FIG. 4 is a schematic top view of the detection portion 13 shown in FIG. 2 and its surroundings to explain the angle adjustment of the detection portion 13. As mentioned above, the distance G between the sensor gear 12 and the detection portion 13 can be finely adjusted in accordance with the fastening force (axial thrust) of the screws 16. Therefore, if one of the two screws 16a and 16b shown in FIG. 4, e.g., the screw 16a is fastened more strongly than the other screw 16b, the portion of the portion to be fastened 14b where the screw 16a is attached is extended to a larger extent than the portion of the portion to be fastened 14b where the other screw 16b is attached. As a result, the detection portion 13 is inclined together with the holder body 14a of the sensor holder 14 by an angle α with respect to the reference surface O, as indicated by a dotted and dashed line in FIG. 4. The angle α of the detection portion 13 can be adjusted together with the distance G by fastening or loosening the screw 16a. Note that, it is preferable that the distance between the screws 16a and 16b be as long as possible in order to incline the detection portion 13 appropriately.

If the screw 16b is fastened more strongly than the screw 16a in FIG. 4, the portion of the portion to be fastened 14b where the screw 16b is attached is extended in the horizontal direction, so that the detection portion 13 is inclined with respect to the reference surface O in a direction opposite the angle α.

As may be understood from the foregoing, according to the present invention, the distance G between the sensor gear 12 and the detection portion 13 can be effectively adjusted only by fastening the screws 16 and the sensor holder 14 can be secured by the screws 16 at the same time as the completion of the adjustment of the distance G. Namely, according to this embodiment, the adjustment of the distance G can be carried out within a short period of time. Furthermore, the distance G is finely adjusted in accordance with the axial thrust of the screws 16, and therefore the displacement of the detection portion can be easily estimated. Consequently, it is possible to prevent the sensor gear 12 and the detection portion 13 from being brought into contact with each other during the adjustment of the distance G, thus leading to damage to the sensor gear 12 and/or the detection portion 13.

Furthermore, according to this embodiment, as the two screws 16 are used to secure the portion to be fastened 14b of the sensor holder 14 and are arranged in the to-be-secured portion 14b so that the detection portion 13 is located in a position corresponding to a median point of the two screws 16, the distance and angle of the detection portion 13 from and with respect to the sensor gear 12 can be adjusted.

Moreover, according to this embodiment, the distance G between the sensor gear 12 and the detection portion 13 and the angle of the detection portion 13 can be adjusted only by fastening the screws 16, and therefore, the adjustment can be easily automated by a screw fastening device or a robot.

Second Embodiment

The second embodiment of the present invention will be discussed below. The following discussion will be mainly addressed to the difference from the aforementioned first embodiment. The components same as or corresponding to those of the first embodiment will be assigned the same reference numerals and no duplicate explanation therefor will be given hereinafter.

Figure 5:
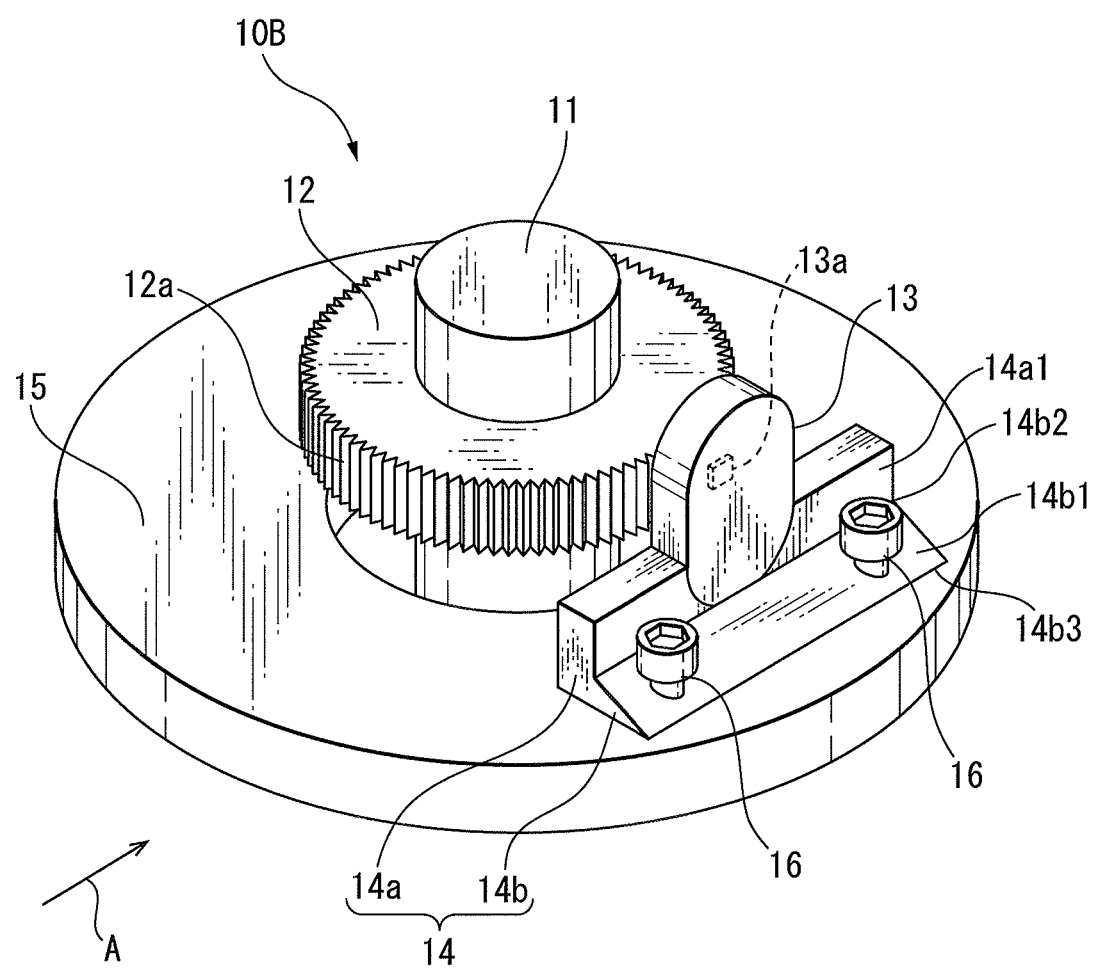
FIG. 5 is a perspective view of the magnetic sensor of the motor according to a second embodiment of the present invention.
Figure 6A:
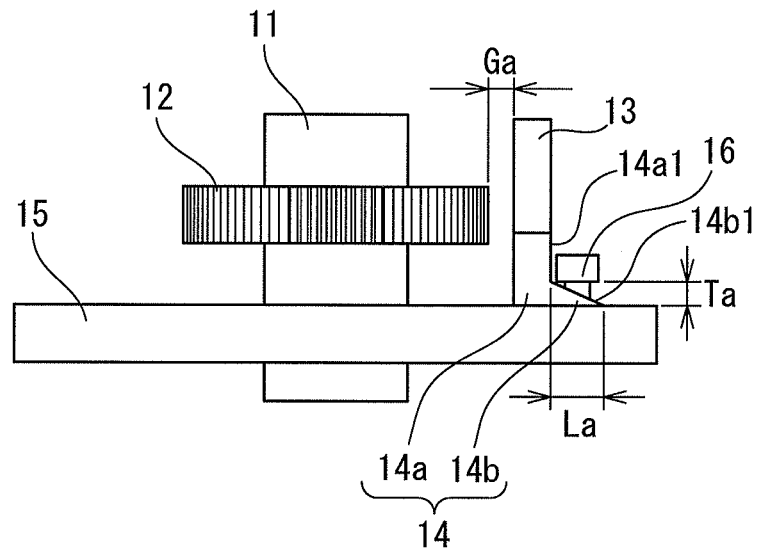
FIG. 6A is a view of the magnetic sensor as viewed in the direction indicated by the arrow A in FIG. 5.
Figure 6B:
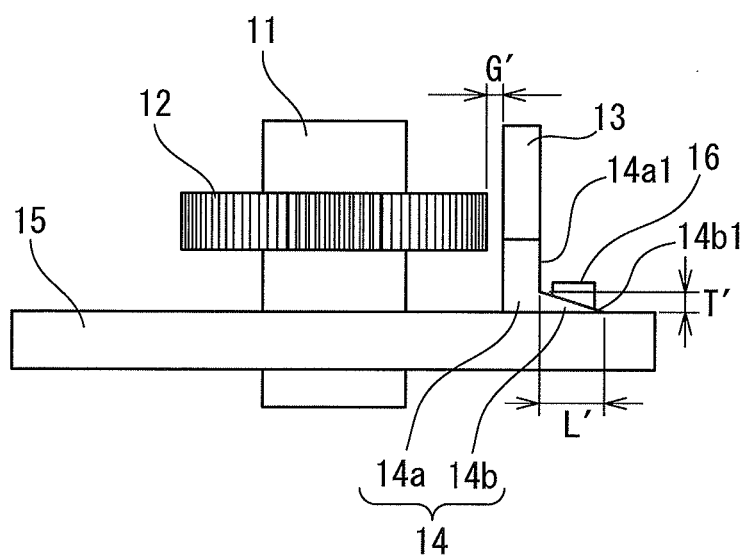
FIG. 6B is a view of a sensor holder shown in FIG. 6A, with the screw being further fastened.

FIG. 5 is a perspective view of a magnetic sensor of a motor according to the second embodiment. FIG. 6A is a view of the magnetic sensor shown in FIG. 5 as viewed in the direction indicated by the arrow "A" in FIG. 5 and FIG. 6B is a view of the sensor holder corresponding to FIG. 6A, with the screws being further fastened.

As can be seen in FIG. 5, the magnetic sensor 10B according to the second embodiment is different from the magnetic sensor 10A according to the first embodiment shown in FIG. 2 in the shape of the portion to be fastened 14b of the sensor holder 14. Namely, as can be seen in FIGS. 5 and 6A, the upper surface of the portion to be fastened 14b with which the heads of the screws 16 are in contact, is a tapered surface 14b1 which is inclined with respect to the bottom surface of the portion to be fastened 14b. More specifically, the tapered surface 14b1 is defined by a substantially rectangular surface. As shown in FIG. 5, the portion to be fastened 14b is formed integrally with the holder body 14a so that one of the major sides 14b2 and 14b3 of the tapered surface 14b1, i.e., the major side 14b2 is connected to the one side 14a1 of the holder body 14a. Moreover, the major side 14b2 of the tapered surface 14b1 is located at a higher position than the other major side 14b3 of the tapered surface 14b1. In other words, the tapered surface 14b1 of the portion to be fastened 14b is formed so that the thickness of the portion to be fastened 14b gradually decreases as the distance of the portion to be fastened 14b from the one side 14a1 of the holder body 14a increases.

In the second embodiment, at least the portion to be fastened 14b is made of a material having an elastic modulus lower than the materials of the sensor mounting base 15 and the screws 16, as in the first embodiment. According to the second embodiment constructed as above, as the upper surface of the portion to be fastened 14b is defined by a tapered surface, the response to the adjustment of the distance between the sensor gear 12 and the detection portion 13 by the screws 16 can be enhanced.

Figure 7:
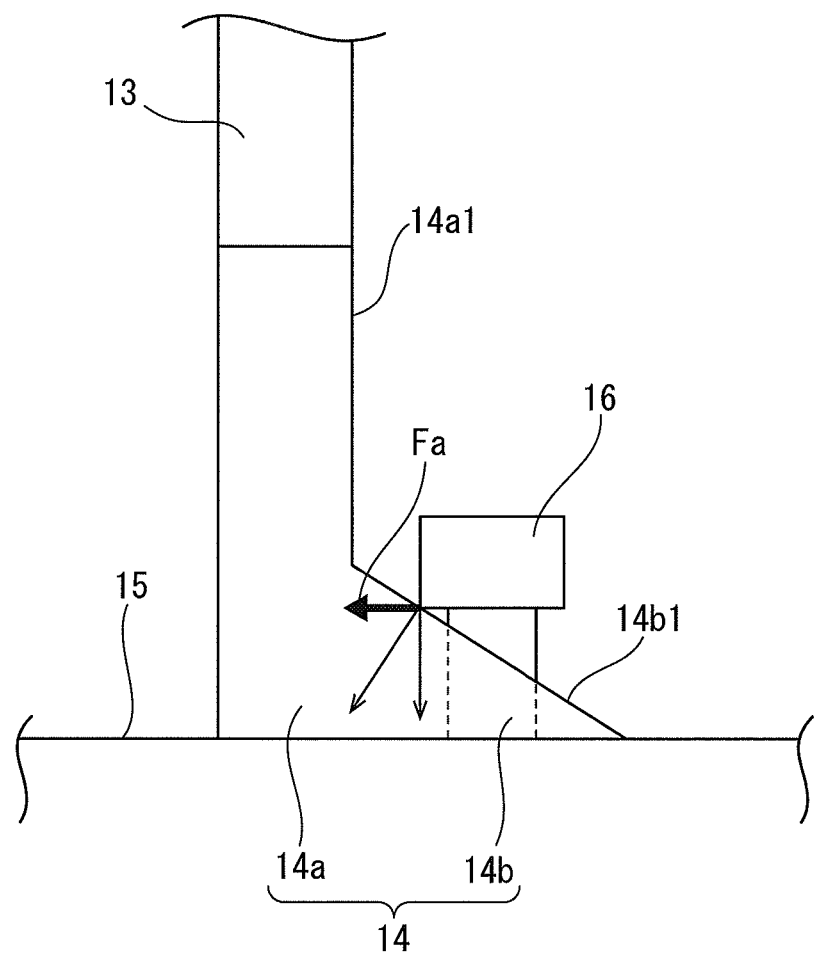
FIG. 7 is an enlarged view of the screw shown in FIG. 6B and its surroundings.

The principle of the system to enhance the response to the adjustment of the distance will be specifically discussed below with reference to FIGS. 6A, 6B and 7. FIG. 7 is an enlarged view of the screw 16 shown in FIG. 6B and its surroundings. Note that, in FIG. 6A, it is assumed that the maximum thickness of the portion to be fastened 14b of the sensor holder 14 is T, the length of the portion to be fastened 14b from the one side 14a1 of the holder body 14a in the direction away from the holder body is L, and the distance between the sensor gear 12 and the detection portion 13 is G.

In the sensor holder 14 shown in FIG. 6A, when the screw 16 is fastened, the portion to be fastened 14b is pressed in the axial direction of the screw 16 by the head of the screw 16 due to the axial thrust (fastening force) of the screw 16. Upon pressing, the axial thrust of the screw 16 is applied to the tapered surface 14b1 of the portion to be fastened 14, and accordingly, a component force of the axial thrust (refer to the arrow Fa) as shown in FIG. 7 acts on the tapered surface in a direction to push the portion to be fastened 14b toward the holder body 14a. Due to the axial thrust of the screw 16 and the component force thereof, the thickness T of the portion to be fastened 14b is reduced to T' as shown in FIG. 6B. Furthermore, the length L of the portion to be fastened 14b is increased to L' as shown in FIG. 6B, in the horizontal direction, i.e., mainly in a direction toward the holder body 14a. As a result, the holder body 14a which holds the detection portion 13 is moved toward the sensor gear 12, so that the distance G between the sensor gear 12 and the detection portion 13 is shortened to G' as shown in FIG. 6B.

As mentioned above, according to the second embodiment, when the screws 16 are fastened, the length L of the portion to be fastened 14b can be increased mainly in the direction toward the holder body 14a due to the component force of the axial thrust of the screws 16. Namely, the displacement of the holder body 14a toward the sensor gear 12 caused by the axial thrust of the screws 16 generated when the screws 16 are fastened is increased compared with the aforementioned first embodiment. As a result, the magnetic sensor 10B according to the second embodiment has a higher response to the adjustment of the distance G by the fastening of the screws 16 than the magnetic sensor according to the first embodiment.

Note that, as in the first embodiment, in the second embodiment, the number of the screws 16 is not limited to two, and it is sufficient that at least one screw 16 is provided as long as the sensor holder 14 can be secured thereby while adjusting the distance G as mentioned above. As in the first embodiment, in the second embodiment, a plurality of portions to be fastened 14b, each of which is fastened by each screw 16 may be provided.

Furthermore, in the second embodiment, it is preferable that the two screws 16 be arranged in the to-be-secured portion 14b so that the detection portion 13 is located in a position corresponding to a median point of the two screws 16, as shown in FIG. 5. With such an arrangement, the distance G as well as the angle of the detection portion 13 can be adjusted, as discussed above in connection with the first embodiment.

Although the above discussion has been directed to a magnetic sensor provided in a motor, by way of example, the application of the magnetic sensor of the present invention is not limited to a motor. Furthermore, the aforementioned embodiments have been applied to an apparatus which adjusts the distance between the sensor gear and the detection portion of the magnetic sensor, but the present invention is not limited to the adjustment of the distance of a magnetic sensor and can be applied generally to products which require a fine adjustment of a distance.

Although the above discussion has been applied to representative embodiments, the present invention is not limited thereto and can be variously modified in shape, structure and material, etc., without departing from the spirit of the invention.

Effect of the Aspects of the Invention

According to the first, the second and fifth aspects of the present invention, the portion to be fastened of the sensor holder is made of a material having an elastic modulus lower than the materials of the sensor gear and the screw. Therefore, it is possible to move the holder body formed integrally with the portion to be fastened by fastening or loosening the portion to be fastened by the screws to thereby elastically deform the portion to be fastened. As a result, the distance between the sensor gear and the detection portion can be adjusted. Moreover, as the sensor holder is secured by the screws at the same time as the completion of the adjustment of the distance, it is not necessary to secure the sensor holder by an adhesive, and thus, the aforementioned distance can be easily adjusted within a short period of time. Such an adjustment may be easily automated.

Furthermore, the holder body which holds the detection portion is moved in accordance with the axial thrust of the screws, and therefore the displacement of the detection portion can be easily estimated. Because of this, it is possible to prevent the detection portion from contacting the sensor gear during the adjustment of the distance, thus leading to damage to the sensor gear and/or the detection portion.

According to the third aspect of the present invention, as the surface of the portion to be fastened with which the heads of the screws are brought into contact is defined by a tapered surface, when the heads of the screws press the portion to be fastened, a component force of the axial thrust of the screws acts on the portion to be fastened to push the same toward the holder body. As a result, the displacement of the holder body toward the sensor gear due to the axial thrust generated when the screws are fastened by a predetermined amount is increased compared with the aforementioned first and second aspects. Namely, according to the magnetic sensor of the third aspect, the response to the adjustment of the distance in accordance with the fastening force of the screws can be enhanced.

According to the fourth aspect of the present invention, the screws are arranged in the portion to be fastened so that the detection portion is located in a position corresponding to a median point of the two screws, and therefore, not only the distance between the sensor gear and the detection portion but also the angle of the detection portion can be finely adjusted.

What is claimed is:

1. A magnetic sensor comprising a sensor gear attached to a rotor of a motor, a detection portion which outputs a signal representative of the presence or absence of a plurality of teeth provided on an outer periphery of the sensor gear at predetermined intervals, a sensor holder which holds the detection portion, a sensor mounting base to which the sensor holder is attached, and a screw by which the sensor holder is attached to the sensor mounting base,
wherein
the detection portion on the sensor holder attached to the sensor mounting base is arranged to be opposed to the outer periphery of the sensor gear at a predetermined distance,
the sensor holder has a holder body which holds the detection portion and a portion to be fastened which is fastened to the sensor mounting base by the screw,
the portion to be fastened is provided integrally with one side of the holder body that is located to face opposite the sensor gear, and
at least the portion to be fastened of the sensor holder is made of a material having an elastic modulus lower than the materials of the sensor mounting base and the screw.

2. The magnetic sensor according to claim 1, wherein the portion to be fastened comprises a flat plate.

3. The magnetic sensor according to claim 1, wherein
a surface of the portion to be fastened with which a head of the screw is in contact is defined by a tapered surface, and
the tapered surface extends so that the thickness of the portion to be fastened decreases as the distance of the portion to be fastened from the one side of the holder body increases.

4. The magnetic sensor according to claim 1, wherein two screws are arranged in the portion to be fastened so that the detection portion is placed in a position corresponding to a median point of the two screws.

5. A motor comprising a magnetic sensor according to claim 1.

* * * * *